(12) United States Patent
Guerin et al.

(10) Patent No.: US 9,043,498 B2
(45) Date of Patent: May 26, 2015

(54) AUTOMATIC PINNING AND UNPINNING OF VIRTUAL PAGES FOR REMOTE DIRECT MEMORY ACCESS

(71) Applicant: International Business Machines Corporation, Armonk, NY (US)

(72) Inventors: Xavier R. Guerin, White Plains, NY (US); Xiaoqiao Meng, Yorktown Heights, NY (US); David P. Olshefski, New York, NY (US); John M. Tracey, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/041,375

(22) Filed: Sep. 30, 2013

(65) Prior Publication Data
US 2015/0067087 A1    Mar. 5, 2015

Related U.S. Application Data

(63) Continuation of application No. 14/013,094, filed on Aug. 29, 2013.

(51) Int. Cl.
*G06F 3/00* (2006.01)
*G06F 15/173* (2006.01)
*G06F 12/10* (2006.01)

(52) U.S. Cl.
CPC .......... *G06F 15/17331* (2013.01); *G06F 12/10* (2013.01)

(58) Field of Classification Search
CPC .............................. G06F 15/17331; G06F 12/10
See application file for complete search history.

(56) References Cited

U.S. PATENT DOCUMENTS

| | | | |
|---|---|---|---|
| 6,922,765 B2 * | 7/2005 | Jacobs | 711/173 |
| 2004/0034725 A1 | 2/2004 | Elzur | |
| 2004/0073622 A1 * | 4/2004 | McDaniel et al. | 709/212 |
| 2006/0288187 A1 * | 12/2006 | Burugula et al. | 711/171 |
| 2007/0136554 A1 | 6/2007 | Biran et al. | |
| 2007/0226750 A1 | 9/2007 | Sharp et al. | |
| 2007/0260839 A1 * | 11/2007 | Arndt | 711/165 |
| 2010/0049883 A1 * | 2/2010 | Ben-Yehuda et al. | 710/22 |
| 2011/0106905 A1 | 5/2011 | Frey et al. | |
| 2013/0007406 A1 * | 1/2013 | Sheaffer et al. | 711/207 |

(Continued)

FOREIGN PATENT DOCUMENTS

| | | |
|---|---|---|
| KR | 2007072682 A | 7/2007 |
| WO | 2004017220 A1 | 2/2004 |
| WO | 2005060594 A2 | 7/2005 |

OTHER PUBLICATIONS

Dalessandro et al., "Accelerating Web Protocols Using RDMA", Sixth IEEE International Symposium on Network Computing and Applications (NCA2007) IEEE, Jul. 12-14, 2007; pp. 205-212.

(Continued)

*Primary Examiner* — Elias Mamo
(74) *Attorney, Agent, or Firm* — Cantor Colburn LLP

(57) ABSTRACT

In one exemplary embodiment, a computer-implemented method includes receiving, at a remote direct memory access (RDMA) device, a plurality of RDMA requests referencing a plurality of virtual pages. Data transfers are scheduled for the plurality of virtual pages, wherein the scheduling occurs at the RDMA device. The number of the virtual pages that are currently pinned is limited for the RDMA requests based on a predetermined pinned page limit.

7 Claims, 5 Drawing Sheets

(56) References Cited

U.S. PATENT DOCUMENTS

2013/0080564 A1* 3/2013 Aho et al. .................. 709/212
2013/0262613 A1* 10/2013 Hefty .......................... 709/212
2013/0290473 A1* 10/2013 Chen et al. .................. 709/216

OTHER PUBLICATIONS

Frey et al., "Minimizing the Hidden Cost of RDMA", 2009 29th IEEE International Conference on Distributed Computing Systems, ICDCS '09, Jun. 22-26, 2009; pp. 553-560.

Goncalves et al., "The data cyclotron query processing scheme", ACM Trans. Database Syst. vol. 36, No. 4, Article 27, Dec. 2011, pp. 1-35.

Jagana, et al., "Open RDMA Project: Buidling an RDMA Ecosystem for Linux", In the workshop on Remote Direct Memory Access (RDMA): Applications, Implementations, and Technologies (RAIT), 2004, 9 pages.

Ou et al., "An efficient design for fast memory registration in RDMA", Journal of Network and Computer Applications 32 (2009), pp. 642-651.

Petrini et al., "The Quadrics Network: High-Performance Clustering Technology", IEEE Jan.-Feb. 2002; IEEE Micro, pp. 46-57.

* cited by examiner

AUTOMATIC PINNING AND UNPINNING OF VIRTUAL PAGES FOR REMOTE DIRECT MEMORY ACCESS

CROSS-REFERENCE TO RELATED APPLICATIONS

This application is a continuation of and claims priority from U.S. patent application Ser. No. 14/013,094, filed on Aug. 29, 2013, entitled "AUTOMATIC PINNING AND UNPINNING OF VIRTUAL PAGES FOR REMOTE DIRECT MEMORY ACCESS", the entire contents of which are incorporated herein by reference.

BACKGROUND

The present disclosure relates to remote direct memory access (RDMA) and, more particularly, to automatically pinning and unpinning virtual pages for RDMA operations.

Remote direct memory access (RDMA) is a network interface card (NIC) feature for copying data from the main memory of one computer to the main memory of another computer. RDMA transfers are generally requested by user-space applications given read and/or write access to memory on a remote computer. Before a transfer can be performed, however, the virtual page to be read and/or written must first be swapped into physical memory, if not already resident, and pinned.

Current state-of-the-art methods for implementing RDMA involve specialized hardware (e.g., an Infiniband adapter) along with a specialized software stack (e.g., Infiniband device drivers and Infiniband Verbs). Generally, the copying of data is performed asynchronously by an RDMA adapter, with little to no involvement by the software executing on the processor. Although the user-space application may initiate the transfer, the data movement is performed by the RDMA adapter.

Since RDMA transfers are asynchronous and performed between virtual or physical address spaces, a user-space application initiating a transfer explicitly pins the memory mapped to the virtual addresses associated with the transfer, thus preventing the operating system from swapping the pages to disk. The application, with the assistance of other software, then provides the virtual-to-physical mappings to the RDMA adapter, so that the RDMA adapter can perform virtual-to-physical address translation (VAT). The application posts an RDMA request, which is specified as a virtual-to-virtual address data copy, to the RDMA adapter.

The RDMA adapter uses its VAT mechanism to directly access the physical memory, where the virtual pages are pinned, and uses the physical addresses to perform the data transfer. The RDMA adapter then asynchronously notifies the user-space application when the transfer is complete, via an interrupt or by posting an item on a completion queue that the application periodically polls.

A problem with this conventional method of transferring data between sets of virtual address spaces is that it breaks the abstract virtualization of memory seen by user-space applications, requiring an application to treat virtual memory as something implemented by a physical memory device. Additionally, an application's virtual address space is generally much larger than the actual physical address space, so the amount of memory that the application can pin is much less than its virtual address space. Since an application may not be able to pin the entirety of memory to be transferred, the application must manage the pinning and unpinning of smaller chunks of memory. The application therefore pins the memory, copies a chunk of data to the pinned memory, posts the RDMA request, waits for asynchronous notification of completion of the RDMA operation, and then unpins the memory. The application then repeats these operations with additional chunks of data until the data transfer is complete.

In conventional systems, the RDMA adapter does not verify with the operating system that memory involved in a RDMA transfer is currently pinned. If the application unpins memory but fails to deregister that memory, and then posts an RDMA operation for that memory, bad or corrupted data may be transferred, which also creates a security risk.

In the above process, there is no coordination between the RDMA adapter and the operating system, as RDMA transfers are coordinated by user-space applications. If an application pins memory inefficiently, such pinning reduces the amount of memory that other applications can pin. Further, regardless of efficiency, for systems with many processes performing RDMA operations, the amount of available memory for pinning is constrained. Thus, numerous issues and risks exist with conventional RDMA operation management.

SUMMARY

According to one embodiment of this disclosure, a computer-implemented method includes receiving, at a remote direct memory access (RDMA) device, a plurality of RDMA requests referencing a plurality of virtual pages. Data transfers are scheduled for the plurality of virtual pages, wherein the scheduling occurs at the RDMA device. The number of the virtual pages that are currently pinned for the RDMA requests is limited based on a predetermined pinned page limit.

In another embodiment, a system includes an RDMA device and software. The RDMA device is configured to receive a plurality of RDMA requests referencing a plurality of virtual pages, to schedule data transfers for the plurality of virtual pages, and to limit the number of the virtual pages that are currently pinned for the RDMA requests based on a predetermined pinned page limit. The software is configured to pin the plurality of virtual pages according to the scheduling of the RDMA device.

In yet another embodiment, a computer program product includes a non-transitory computer readable storage medium having computer readable program code embodied thereon. The computer readable program code is executable by a processor to perform a method. The method includes receiving, at an RDMA device, a plurality of RDMA requests referencing a plurality of virtual pages. According to the method, data transfers are scheduled for the plurality of virtual pages, wherein the scheduling occurs at the RDMA device. The number of the virtual pages that are currently pinned for the RDMA requests is limited based on a predetermined pinned page limit.

Additional features and advantages are realized through the techniques of the present disclosure. Other embodiments and aspects of the disclosure are described in detail herein and are considered part of the disclosure. For a better understanding of the various embodiments, along with their advantages and features, refer to the description and to the drawings.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

According to some embodiments of this disclosure, an RDMA device may work together with an operating system to pin and unpin memory, and to swap virtual pages to and from physical memory and secondary storage on an as-needed, on-demand, fine-grained basis. As a result, user-space applications need not manage these operations themselves in an independent and uncoordinated way.

The RDMA device may ask the operating system to swap-in and pin a virtual page if and when the RDMA device plans to read or write to the page in the near future. The RDMA device may then ask the operating system to release the page after it has been transferred as needed.

Figure 1:
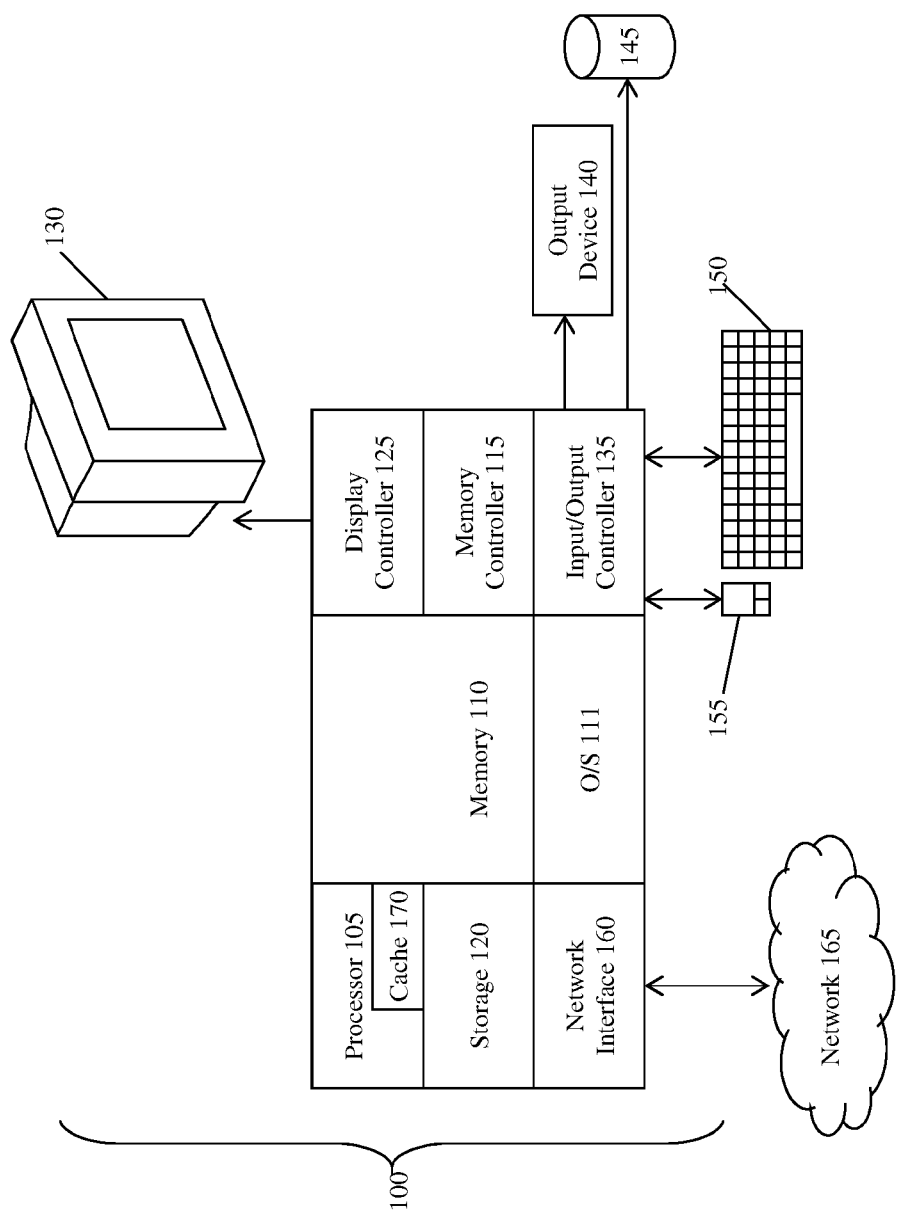
FIG. 1 illustrates a block diagram of a computing device useable with a system according to an exemplary embodiment of this disclosure.

FIG. 1 is a block diagram of a computer system 100 for use in practicing teachings of this disclosure, according to some embodiments. The methods described in this disclosure may be implemented in hardware, software (e.g., firmware), or a combination thereof. In an exemplary embodiment, the methods described are implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer system 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example and not by way of limitation, one or more buses or other wired or wireless connections, as are known in the art. The I/O controller 135 may have additional elements, which are omitted for simplicity, such as controllers, buffers (caches), drivers, repeaters, and receivers, to enable communications. Further, the local interface may include address, control, or data connections to enable appropriate communications among these components.

The processor 105 is a hardware device for executing hardware instructions or software, particularly those stored in memory 110. The processor 105 may be any custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The computer system 100 may further include a display controller 125 coupled to a display 130. In an exemplary embodiment, the computer system 100 may further include a network interface 160 for coupling to a network 165. The network 165 may be an IP-based network for communication between the computer system 100 and any external server, client and the like via a broadband connection. The network 165 transmits and receives data between the computer system 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 2:
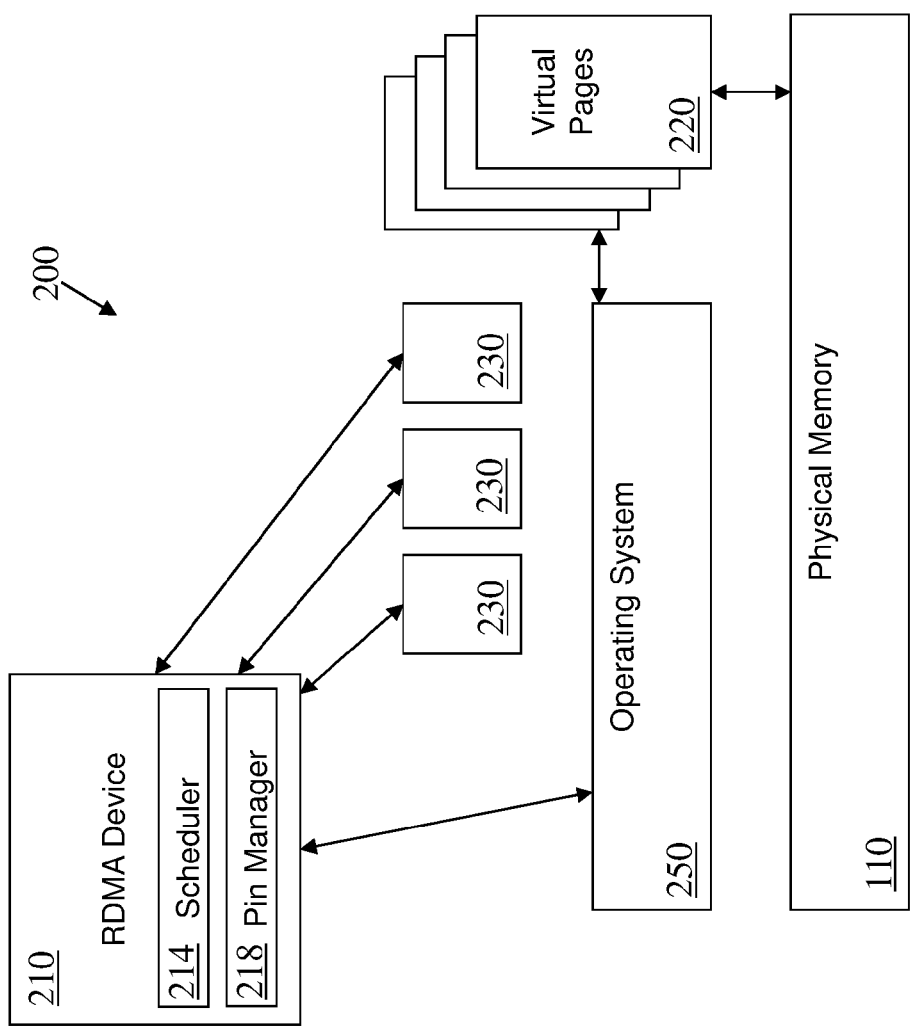
FIG. 2 illustrates a block diagram of a system according to an exemplary embodiment of this disclosure.

FIG. 2 illustrates a block diagram of a system 200 according to some embodiments of this disclosure. As shown, a computer system 100, such as that shown in FIG. 1, may also include an RDMA device 210. The computer's physical memory 110 may be virtualized into virtual memory pages 220 used by software, such as user-space applications 230.

Software 230 may need to read from or write to memory on another computer. As such, the software 230 may post an RDMA request to RDMA device 210, requesting a data transfer. According to exemplary embodiments, the software 230 need not manage the pinning of memory for the RDMA operation. Instead, the RDMA device 210 may work with a local operating system 250 to manage memory swapping, pinning, and unpinning.

The RDMA device 210 may be in communication with a plurality of user-space applications and other software 230, so it may not respond to each RDMA request immediately. When the RDMA device 210 is ready to address a request, the RDMA device 210 may ask the operating system 250 to swap-in and pin one or more virtual pages 220 that the RDMA device 210 plans to read and/or write in the near future.

The RDMA device 210 reads and/or writes virtual pages 220 to perform requested RDMA transfers. Each RDMA request received by the RDMA device 210 may reference virtual addresses. The RDMA device 210 accesses the memory using physical addresses, so virtual-to-physical page mapping must remain invariant for the virtual pages 220 being read or written. Therefore, during an RDMA transfer, the virtual memory associated with the requested transfer must be pinned.

When a desired page 220 is pinned, the operating system 250 may communicate such to the RDMA device 210, which may then perform the needed reading and/or writing according to its own schedule. After the page 220 has been read or written, the RDMA device 210 may ask the operating system 250 to release the virtual page 220.

Letting the RDMA device 210 control the memory swapping and pinning based on when it needs to access that memory can reduce the amount of memory that is pinned at a given point in time, because various user applications 230 are not independently pinning pages 220. Embodiments of this disclosure may allow for a global system view of what pages 220 need to be pinned for transfer, across the activities of all processes on the system 200. Pages 220 may need to be pinned only when the RDMA device 210 plans to read or write them in the near future.

As shown in FIG. 2, the RDMA device 210 may include a scheduler 214 and a pin manager 218. For conventional RDMA handling, software 230 executing on the processor sends RDMA requests to the RDMA device 210 and receives notification from the RDMA device when the associated RDMA transfers have completed. According to embodiments of this disclosure, however, the RDMA device 210 may use its scheduler 214 to determine which pages 220 from among the outstanding transfer requests are read or written and when that reading or writing occurs. The pin manager 218 may determine which pages 220 for outstanding RDMA requests are currently pinned. The pin manager 218 may also generate pin faults to request pinning of certain pages when the scheduler 214 determines that those certain pages should be pinned, and the pin manager 218 may generate unpin faults to request unpinning of certain pages when the scheduler 214 determines that those certain pages are no longer needed for the outstanding RDMA requests.

The RDMA requests arrive at the RDMA device 210 as a series of transfer requests. Upon completing the RDMA requests, the RDMA device 210 may post a series of notifications corresponding to requested RDMA transfers. Each completion notice may correspond to a single RDMA request, and each RDMA request may correspond to a single eventual completion notice. The order of completions and resulting completion notices need not match the order in which requests are received at the RDMA device 210. The time an RDMA request is completed may depend on scheduling determined by the scheduler 214 of the RDMA device 210, as well as the work required to complete that request.

The scheduler 214 may determine which pages 220 should be pinned and when each RDMA transfer should occur based on various factors. For example, the scheduler 214 may give highest priority transfers related to pages 220 that are currently pinned. Some consideration may also be given to the order in which RDMA requests were received. Additionally, the scheduler 214 may predict which pages 220 may be needed in the future, and these pages 220 may be pinned in anticipation of such need. Predictions may be based on usage history of the virtual pages 220. Prediction methods may include one or more of the following, without limitation: identification of periodic accesses to one or more virtual pages 220, identification of access to sequential virtual page addresses, and identification of a prefix set of virtual page addresses. The RDMA device 210 may be capable of measuring the latency associated with pinning and unpinning a set of virtual pages 220. This latency may be defined as the difference between when the RDMA device 210 signals a pin fault or an unpin fault and the time the RDMA device 210 receives a confirmation of the pinning or unpinning. This latency may be a consideration in determining when pin faults and unpin faults are generated. In some embodiments, the scheduler 214 may seek to minimize, or otherwise reduce or manage, this latency through its transfer scheduling.

The RDMA device 210 may handle the RDMA requests roughly in the order in which they were received, but exceptions to this order may be made by the scheduler 214 for the sake of efficiency or other considerations. For example, RDMA transfers for pages 220 that are currently pinned may take precedence over transfers for earlier-received RDMA requests. There is some overhead involved in pinning and unpinning pages, and thus, performing transfers for pages that are already pinned may provide more efficient RDMA transfer handling than swapping those pages 220 out in favor of earlier requests.

In some embodiments, the scheduler 214 may proceed to perform RDMA transfers for the virtual pages 220 that meet the following two criteria: (1) they still need to be accessed to complete one or more outstanding RDMA transfer requests; and (2) they are currently pinned. When the scheduler 214 determines that additional pages should be pinned that are needed for outstanding RDMA requests, the pin manager 218 may generate pin faults to request pinning of those pages. When an RDMA request is completed, i.e., when the applicable transfers have been performed, the RDMA device 210 may post a completion notice. The RDMA device 210, via its pin manager 218, may request that the operating system 250 unpin pages 220 that are currently pinned but no longer need to be accessed to complete any requested RDMA transfers.

To ensure that the amount of memory pinned for received RDMA requests does not become too large, the RDMA device 210 may use a predetermined limit on the number of pinned pages 220 allowed at a given time. The limit may be chosen to provide a balance between pinning enough pages such that RDMA requests can proceed efficiently and avoiding overusing the physical memory 110 with pinned pages 220 that will not be used for RDMA transfers in the near future.

The scheduler 214 may attempt to keep the total number of pinned pages 220 below the predetermined pinned page limit. To this end, the schedule 214 may ensure that the current number of pinned pages 220, plus the number of pages 220 it requests to be pinned, less the number of pages 220 it requests to be unpinned, does not exceed the pinned page limit. If this criterion cannot be met after generating one more pin fault, then the schedule 214 may postpone the pin manager's generating such a pin fault until this criterion can be met, which in that case would require additional pages 220 to be unpinned or additional unpin faults to be generated. In an exemplary embodiment, the scheduler 214 seeks to maximize the number of pages 220 pinned for outstanding RDMA requests without exceeding the pinned page limit.

A pin fault generated by the RDMA device 210 may cause software executing on the processor to swap-in, pin, and register the one or more virtual pages 220 associated with the pin fault. Registration indicates that a page 220 is pinned and therefore available for RDMA transfers. An unpin fault generated by the RDMA device 210 may analogously cause software executing on the processor to unpin and unregister the associated one or more virtual pages 220.

A pin fault or unpin fault may be implemented by various means. For example, and not by way of limitation, a pin fault may be implemented as an interrupt or by writing to a shared memory location or an event work queue, and may specify a set of one or more virtual pages 220 to be pinned. After receiving the request for pinning or pinning via a pin fault or an unpin fault, the operating system 250 or other software 230 may reply to the request. A reply to a pin fault or unpin fault may indicate that all or a subset of the virtual pages 220 associated with the pin fault have been pinned, along with their mappings as provided via an existing registration mechanism. Other mechanisms for pin faults and unpin faults may also be used.

Communications from the operating system 250 or other software 230 to the RDMA device 210, for replying to pin and unpin faults, may also be implemented in various ways. For example, and not by way of limitation, the operating system 250 or other software 230 may perform a Peripheral Component Interconnect Express (PCIe) configuration or memory write to one or more of the RDMA device's registers. Thus, the operating system 250, or other software 230, and the RDMA device 210 may be enabled to communicate for the management of memory pinning associated with RDMA operations.

Figure 3:
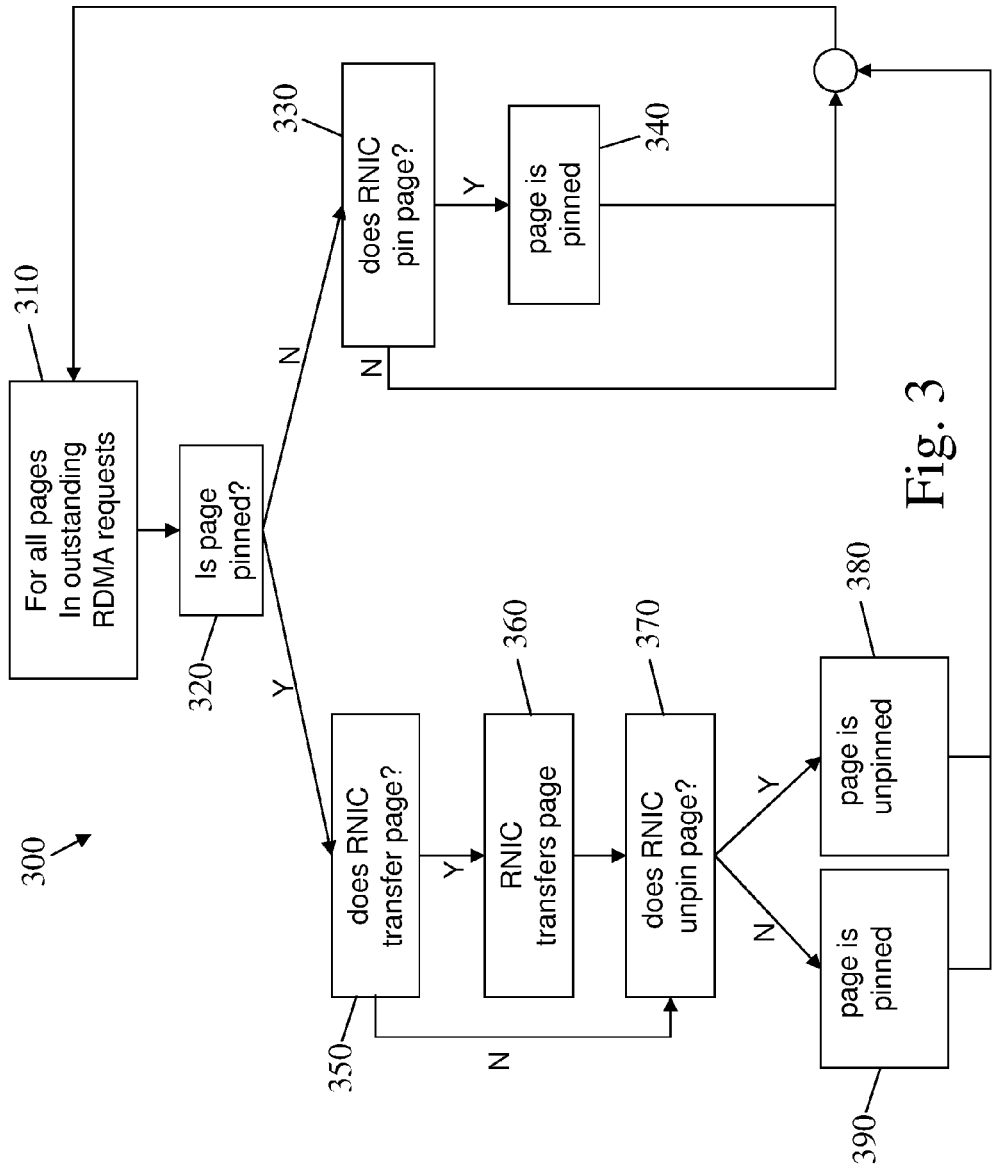
FIG. 3 illustrates a flow diagram of a method for pinning virtual pages, according to an exemplary embodiment of this disclosure.

FIG. 3 illustrates a flow diagram of a method 300 for handling virtual pages 220 for RDMA requests, according to an exemplary embodiment of this disclosure. The RDMA device 210 may loop through this method 300 repeatedly to fulfill RDMA requests. At block 310, the RDMA device 210 may consider each virtual page 220 for which data needs to be transferred in accordance with not-yet-completed RDMA requests. At decision block 320, the RDMA device 210 asks whether the page 220 in question is pinned. If the page is not pinned, then at decision block 330, the RDMA device 210 may decide whether to request pinning of the page 220, based on the RDMA device's scheduling criteria. If the RDMA device 210 decides to pin the page 220, then at block 340, the page 220 may be pinned by the operating system 250 or other software 230. If the RDMA device 210 decides against pinning the page at this time, then the method 300 starts over at block 310.

On the other hand, at decision block 350, if the page 220 was deemed to already be pinned at block 320, then the RDMA device 210 may determine based on its scheduling criteria whether to perform a transfer related to the page 220. If the RDMA device 210 decides to perform a transfer, then the transfer is performed at block 360. Regardless of whether the transfer is performed, at decision block 370, the RDMA device 210 may determine whether to request unpinning of the page 220. If it decides that the page 220 should be unpinned, then the unpinning occurs at block 380. Otherwise, the page 220 may remain pinned at block 390. Regardless, the method 300 then starts over at block 310.

Figure 4:
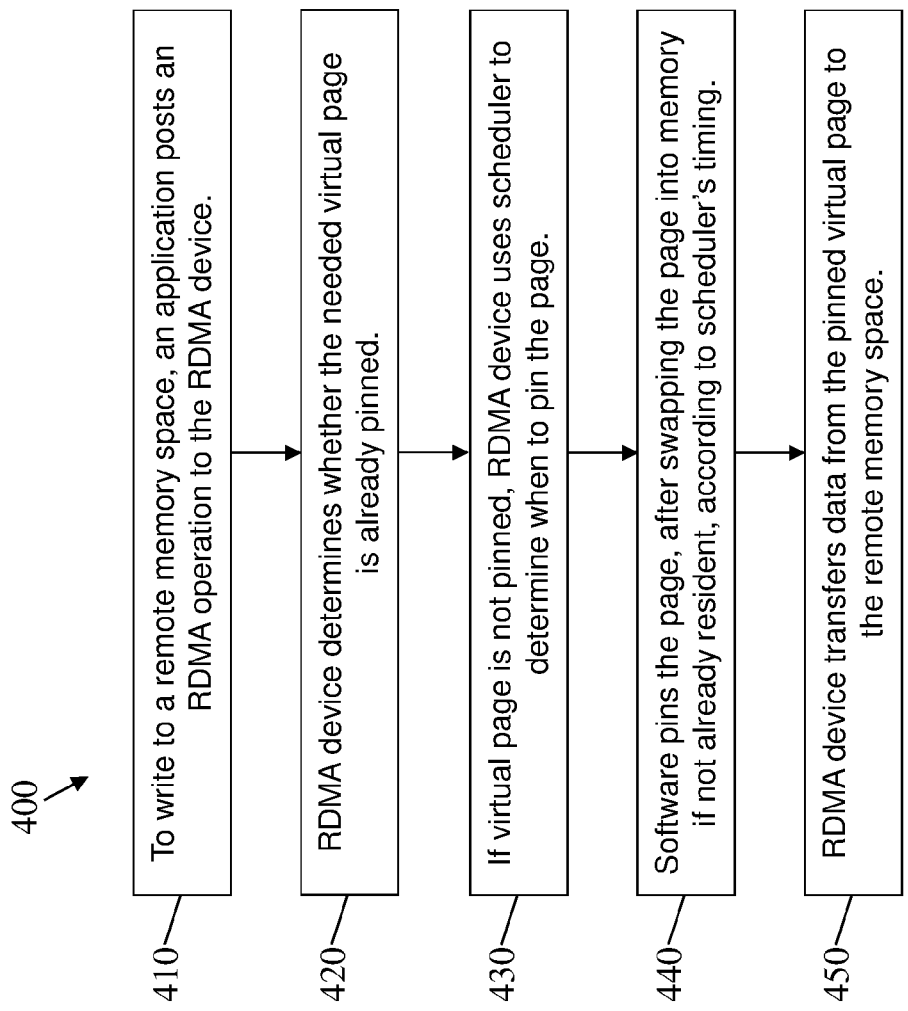
FIG. 4 illustrates a flow diagram of a method for performing an RDMA write operation, according to an exemplary embodiment of this disclosure.

FIG. 4 illustrates a flow diagram of a method 400 for performing an RDMA write operation, according to an exemplary embodiment of this disclosure. When a local application 230 desires to write data from its virtual memory to a remote memory space, the application 230 may post an RDMA write operation to the RDMA device 210, as shown at block 410. Because the operating system 250 informs the RDMA device 210 of when it swaps pages into memory, the RDMA device 210 may be aware when the needed virtual page 220 is not pinned. Thus, at block 420, the RDMA device 210 may determine whether the needed virtual page 220 is already pinned. If not, at block 430, scheduler 214 of the RDMA device 210 may determine when to pin the virtual page 220. At block 440, the operating system 250 or other software 230 may pin the virtual page in accordance with the scheduler's 214 timing, first swapping the virtual page 220 into physical memory 110 if the virtual page 220 is not already resident. At block 450, the RDMA device 210 may transfer data from the pinned virtual page 220 to the remote memory space.

Figure 5:
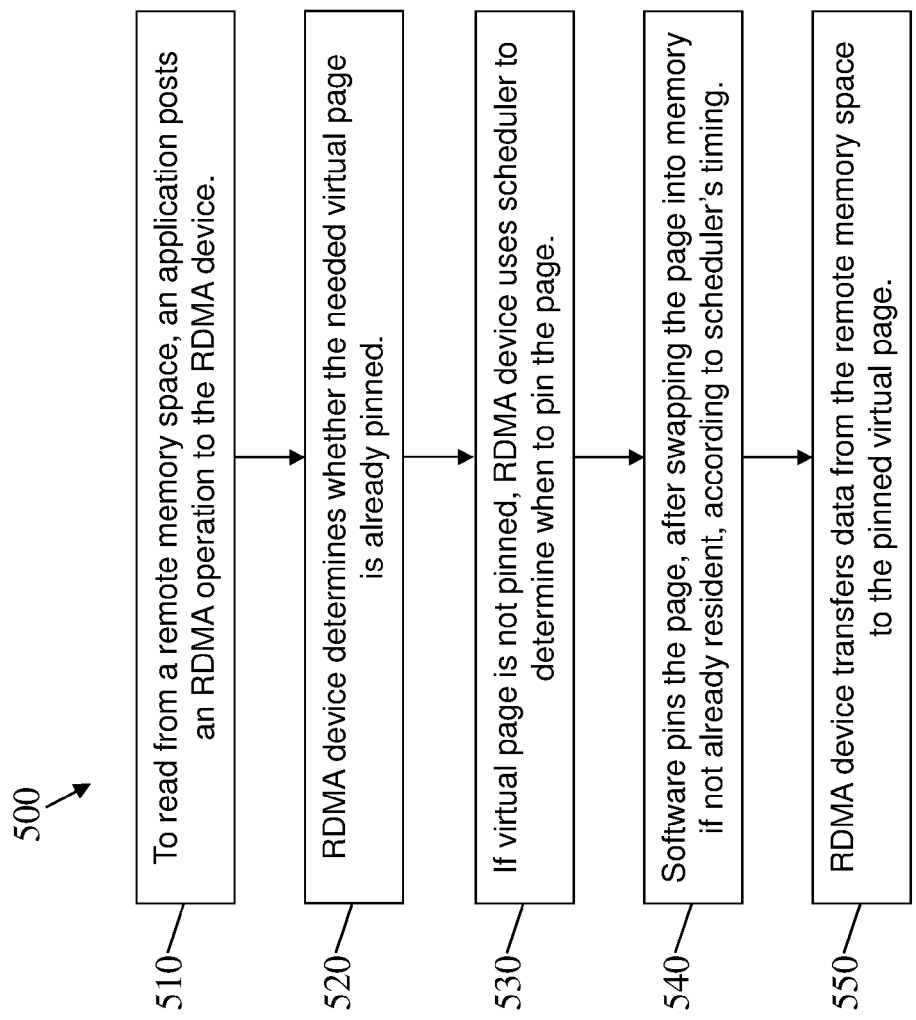
FIG. 5 illustrates a flow diagram of a method for performing an RDMA read operation, according to an exemplary embodiment of this disclosure.

FIG. 5 illustrates a flow diagram of a method 500 for performing an RDMA read operation, according to an exemplary embodiment of this disclosure. When a local application 230 desires to read data from a remote memory space into a virtual page 220, the application 230 may post an RDMA read operation, as shown at block 510. Because the operating system 250 informs the RDMA device 210 of when it swaps pages 220 into memory, the RDMA device 210 may be aware when the virtual page 220 is not pinned. Thus, at block 520, the RDMA device 210 may determine whether the needed virtual page 220 is already pinned. If not, at block 530, scheduler 214 of the RDMA device 210 may determine when to pin the virtual page 220. At block 540, the operating system 250 or other software 230 may pin the virtual page in accordance with the scheduler's 214 timing, first swapping the virtual page 220 into physical memory 110 if the virtual page 220 is not already resident. At block 550, the RDMA device 210 may perform the RDMA read operation, reading data from the remote memory space and placing that data into the virtual page 220.

An inbound RDMA operation, meaning an operation initiated by an application on a remote computing device related to one or more virtual pages 220 on the local computer system 100, may require similar operations to the above. After receiving an incoming read or write operation from across a network, the RDMA device 210 may determine if the relevant virtual page 220 is resident in physical memory 110. This determination may be made my examining the local VAT mechanism. If the virtual page 220 is not in physical memory, the RDMA device 210 may schedule pinning of the virtual page 220 to perform the RDMA operation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising
a remote direct memory access (RDMA) device configured to:
- receive, from two or more user applications, a plurality of RDMA requests referencing a plurality of virtual pages;
- schedule data transfers for the two or more user applications, wherein the scheduling comprises:
  - ordering the plurality of RDMA requests according to when they were received; and
  - performing a first RDMA request out of order based on the first RDMA request referencing a virtual page that is currently pinned; and
- limit the number of the virtual pages that are currently pinned for the RDMA requests based on a predetermined pinned page limit; and software configured to pin the plurality of virtual pages according to the scheduling of the RDMA device.

2. The system of claim 1, the RDMA device being further configured to generate a pin fault related to a first virtual page of the plurality of virtual pages, and the software being further configured to pin and register the first virtual page in response to the pin fault.

3. The system of claim 1, the RDMA device being further configured to determine whether the first virtual page of the plurality of virtual pages is currently pinned.

4. The system of claim 1, the RDMA device being further configured to:
- complete a first subset of the plurality of RDMA requests, wherein a second subset of the RDMA requests has yet to be completed; and
- determine whether a first virtual page that is currently pinned is referenced by the second subset of the RDMA requests.

5. The system of claim 1, wherein the RDMA device is configured to schedule the data transfers for the plurality of virtual pages at least by managing an amount of time taken in total to pin the plurality of virtual pages for the plurality of RDMA requests.

6. The system of claim 1, wherein the RDMA device is configured to schedule the data transfers for the plurality of virtual pages at least by giving priority to a first subset of the plurality of virtual pages, wherein the first subset comprises virtual pages that are currently pinned.

7. The system of claim 1, the RDMA device being further configured to:
- predict that a first RDMA request will be received referencing a first virtual page; and
- request that the first virtual page be pinned based on the prediction.

* * * * *